US007069581B2

(12) United States Patent
Fu et al.

(10) Patent No.: US 7,069,581 B2
(45) Date of Patent: Jun. 27, 2006

(54) METHOD AND APPARATUS TO FACILITATE CROSS-DOMAIN PUSH DEPLOYMENT OF SOFTWARE IN AN ENTERPRISE ENVIRONMENT

(75) Inventors: Tianying Fu, Beaverton, OR (US); Sunil S. Kadam, Hillsboro, OR (US); Michael P. Bacus, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 856 days.

(21) Appl. No.: 09/971,333

(22) Filed: Oct. 4, 2001

(65) Prior Publication Data

US 2003/0070089 A1 Apr. 10, 2003

(51) Int. Cl.
*H04L 9/00* (2006.01)

(52) U.S. Cl. .................... 726/3; 726/1; 726/2; 713/183

(58) Field of Classification Search ................ 713/201, 713/202; 726/3

See application file for complete search history.

(56) References Cited

U.S. PATENT DOCUMENTS 5,875,296 A * 2/1999 Shi et al. .................... 713/202
6,332,158 B1 * 12/2001 Risley et al. ............... 709/219
6,339,423 B1 * 1/2002 Sampson et al. ........... 715/854
6,408,336 B1 6/2002 Schneider et al. .......... 709/229
6,681,323 B1 1/2004 Fontanesi et al. .............. 713/1
2001/0056572 A1 * 12/2001 Richard et al.

OTHER PUBLICATIONS

Office Action Summary from U.S. Appl. No. 09/952,755 which was mailed on Apr. 15, 2005.
"ePolicy Orchestrator Product Guide Version 2.0" McAfee, May 2001.

* cited by examiner

*Primary Examiner*—Kambiz Zand
(74) *Attorney, Agent, or Firm*—Zilka-Kotab, PC; Christopher J. Hamaty

(57) ABSTRACT

One embodiment of the present invention provides a system to facilitate cross-domain push deployment of software in an enterprise environment. The system operates by receiving a machine name and a domain name associated with a client at a server. Next, the system creates an entry in a database, which associates the machine name with the domain name. This entry establishes what software to deploy to the client. The system then accepts a user name and a password from the server administrator to gain access to the client. The system authenticates the server to the client using the user name and password. After authenticating the server to the client, the system pushes the software package to the client.

17 Claims, 3 Drawing Sheets

METHOD AND APPARATUS TO FACILITATE CROSS-DOMAIN PUSH DEPLOYMENT OF SOFTWARE IN AN ENTERPRISE ENVIRONMENT

RELATED APPLICATION

The subject matter of this application is related to the subject matter in a co-pending non-provisional application by Sunil S. Kadam, Tianying Fu, Satish K. Shetty, and Michael P. Bacus entitled, "Method and Apparatus to Facilitate Remote Software Management by Applying Network Address-Sorting Rules on a Hierarchical Directory Structure," having serial number TO BE ASSIGNED, and filing date Sep. 13, 2001.

BACKGROUND

1. Field of the Invention

The present invention relates to management of software in a distributed system. More specifically, the present invention relates to a method and an apparatus to facilitate cross-domain push deployment of software in an enterprise environment.

2. Related Art

Software management presents many challenges to an administrator of an enterprise system. It encompasses many aspects of configuring and maintaining the enterprise system, such as software distribution, configuration management, and security policy management.

In smaller enterprise systems, it is feasible for an administrator to visit each computer within the enterprise to distribute the necessary software and create the necessary configurations. However, as the enterprise grows or spreads to multiple locations, it quickly becomes impractical for the administrator to visit each computer.

Administrators, therefore, have developed methods to remotely distribute software and configure the computers within an enterprise system. These methods, while advantageous, present their own set of problems. Managing a computer system from a central location can force the administrator to cross one or more untrusted domains to reach a trusted computer within a trusted domain.

Crossing an untrusted domain while remotely distributing software and managing a remote computer system provides a point-of-vulnerability to a person or entity with malicious intent. This point-of-vulnerability could allow fallacious substitute software packages, system configurations, and/or security policies to be substituted for the desired packages, configurations, and security policies.

What is needed is a method and an apparatus to facilitate cross-domain push deployment of software in an enterprise environment that does not have the problems identified above.

SUMMARY

One embodiment of the present invention provides a system to facilitate cross-domain push deployment of software in an enterprise environment. The system operates by receiving a machine name and a domain name associated with a client at a server. Next, the system creates an entry in a database, which associates the machine name with the domain name. This entry establishes what software to deploy to the client. The system then accepts a user name and a password from the server administrator to gain access to the client. The system authenticates the server to the client using the user name and password. After authenticating the server to the client, the system pushes the software package to the client.

In one embodiment of the present invention, the domain name is associated with a domain that may include an untrusted domain In one embodiment of the present invention, the system accesses the domain across a network.

In one embodiment of the present invention, the network includes the Internet.

In one embodiment of the present invention, authenticating the server to the client includes establishing administrator privileges on the client.

In one embodiment of the present invention, creating the entry in the database includes creating the entry in a hierarchical directory structure.

In one embodiment of the present invention, pushing the software package to the client includes copying the software package to the client from the server, installing the agent from the software package onto the client, and executing the agent on the client.

In one embodiment of the present invention, the agent downloads a software policy from the server to the client. The agent then enforces the software policy.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figure 1:
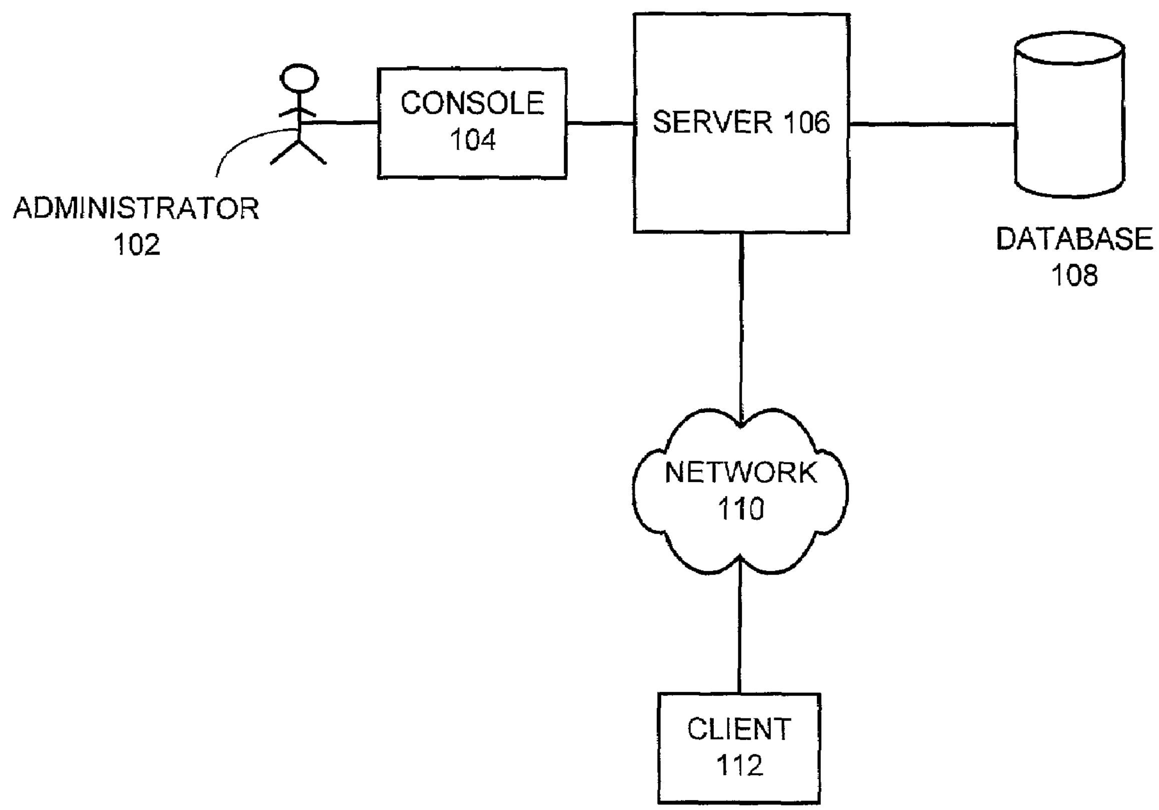
FIG. 1 illustrates computer systems coupled together in accordance with an embodiment of the present invention.

FIG. 1 illustrates computing devices coupled together in accordance with an embodiment of the present invention. The system includes console 104, server 106, database 108, and client 112. Server 106 is coupled to client 112 across network 110.

Server 106 can generally include any computational node including a mechanism for servicing requests from a client for computational and/or data storage resources. Client 112 can generally include any node on a network including computational capability and including a mechanism for communicating across the network.

Network 110 can generally include any type of wire or wireless communication channel capable of coupling together computing nodes. This includes, but is not limited to, a local area network, a wide area network, or a combination of networks. In one embodiment of the present invention, network 110 includes the Internet.

Database 108 can include any type of system for storing data in non-volatile storage. This includes, but is not limited to, systems based upon magnetic, optical, and magneto-optical storage devices, as well as storage devices based on flash memory and/or battery-backed up memory.

Administrator 102 accesses server 106 using console 104 to push software to client 112. Client 112 may be a new client being added to an enterprise system, or client 112 may be a client of server 106 but may need updated software. Client 112 may be located in a different network domain from server 106, and this different domain may be an untrusted domain.

During operation, administrator 102 enters the machine name and the domain name of client 112 into console 104. Server 106 accepts this machine name and domain name from console 104 and enters both into a hierarchical directory structure within database 108.

Administrator 102 also enters a user name and a password that are known to client 112 at console 104. Server 106 accepts the user name and password from console 104 and uses both to authenticate itself to client 112. Note that the user name and password may be encrypted using a suitable encryption system while in transit across network 110.

After authenticating itself with client 112, server 106 determines what software to push to client 112 by examining the hierarchical directory structure within database 108. Different software can be selected based on where client 112 has been placed within the hierarchical directory structure. This hierarchical directory structure can be organized to map to a physical or logical layout of the enterprise system, thereby allowing different software to be pushed to different clients on the network.

After authenticating server 106, client 112 accepts the software package from server 106. This software package includes one or more self-extracting programs. In particular, this software package includes an agent program, which is extracted, installed, and executed on client 112. The agent can then download other software, security policy files, and the like from server 106. Additionally, the agent can enforce security policies on client 112.

Clients and Domains

Figure 2A:
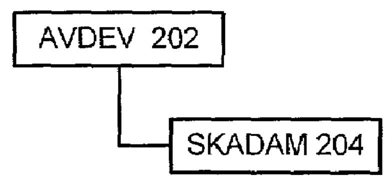
FIG. 2A illustrates a client and a domain in accordance with an embodiment of the present invention.

FIG. 2A illustrates a client and a domain in accordance with an embodiment of the present invention. SKADAM 204 is a client within domain AVDEV 202. SKADAM 204 is being added to the enterprise system.

Figure 2B:
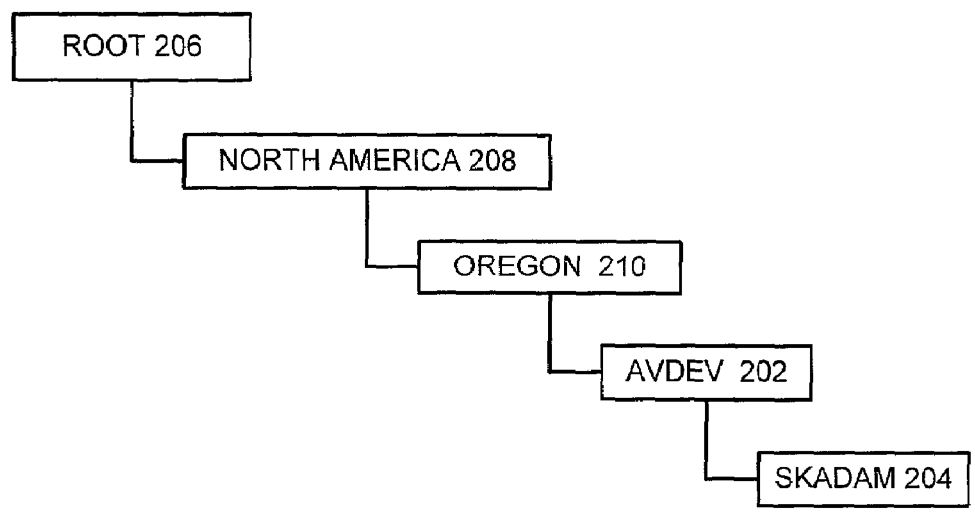
FIG. 2B illustrates the client and the domain added to a hierarchical directory structure in accordance with an embodiment of the present invention.

FIG. 2B illustrates the client and the domain added to a hierarchical directory structure in accordance with an embodiment of the present invention. Domain AVDEV 202 is added to the hierarchical directory structure under OREGON 210. OREGON 210 is organized under NORTH AMERICA 208 which is directly under ROOT 206. Note that the hierarchical directory structure can be organized by other than geographic location. For example, the hierarchical directory structure can be organized by departments and sub-departments of the enterprise system.

Software Package

Figure 3:
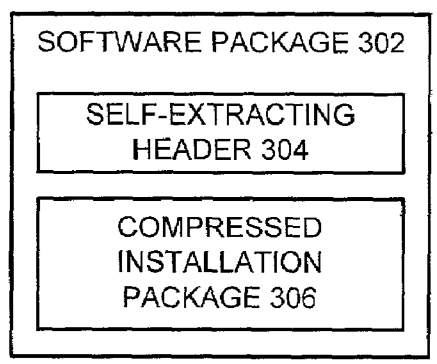
FIG. 3 illustrates the file structure of self-extracting agent software package 302 in accordance with an embodiment of the present invention.
Figure 4:
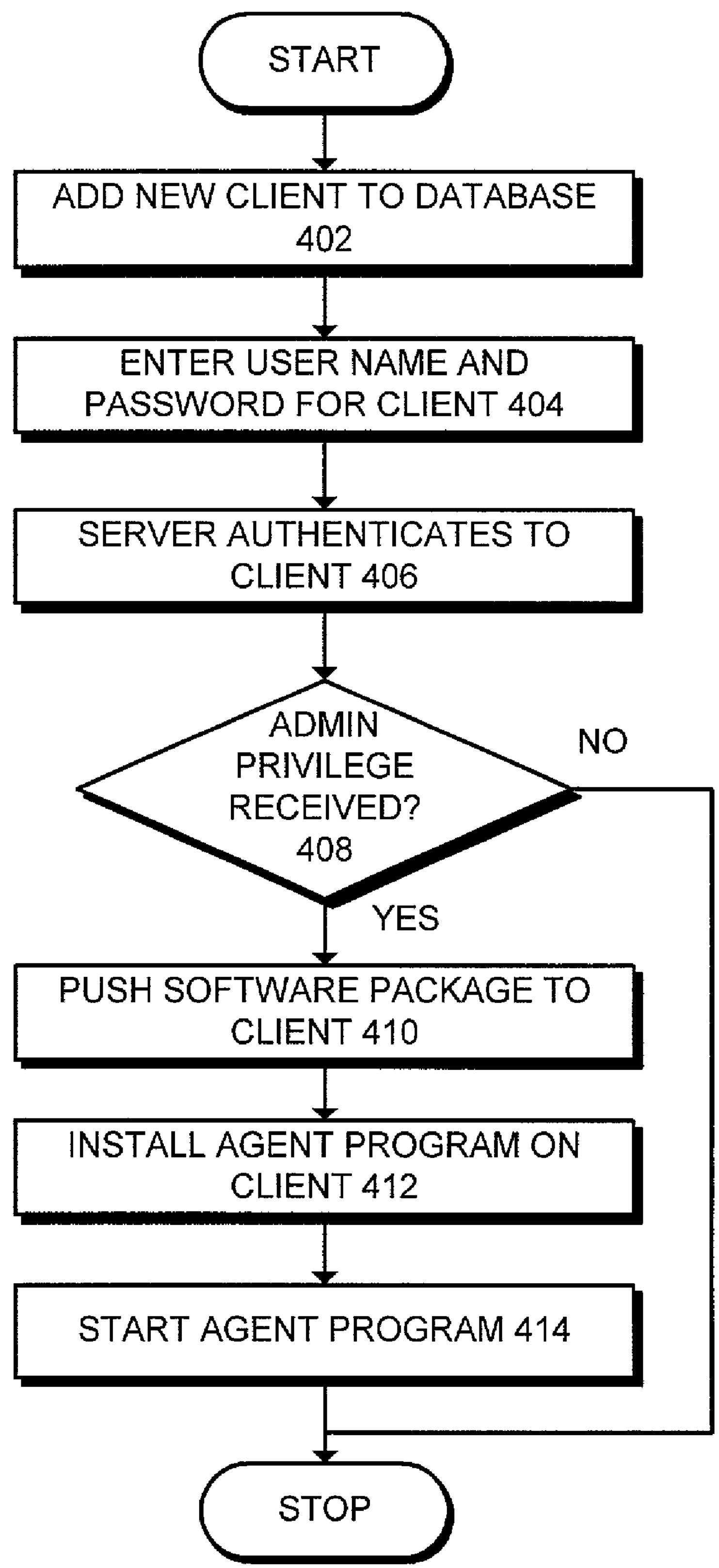
FIG. 4 is a flowchart illustrating the process of installing and executing an agent program in accordance with an embodiment of the present invention.

FIG. 3 illustrates the file structure of self-extracting agent software package 302 in accordance with an embodiment of the present invention. Software package 302 includes self-extracting header 304 and compressed installation package 306. Self-extracting header 304 is an executable program, which, when executed, opens compressed installation package 306, uncompresses compressed installation package 306, and installs the payload of compressed installation package 306. This payload includes an agent, which is installed on client SKADAM 204, and which can download software and security policies from server 106. This agent can also enforce security policies Agent Installation FIG. 4 is a flowchart illustrating the process of installing and executing an agent program in accordance with an embodiment of the present invention. The system starts when administrator 102 adds a new client, for example SKADAM 204, to the hierarchical directory structure in database 108 (step 402). Next, administrator 102 enters a user name and password recognizable by client 112 (step 404).

Next, server 106 uses the user name and password entered by administrator 102 to authenticate to the client (step 406). Server 106 then determines whether server 106 has received administrator privileges from client 112 (step 408). If not, the process is terminated. Note that server 106 may, if desered, present an error message to administrator 102 on console 104.

If server 106 receives administrator privileges from client 112, server 106 pushes a software package to client 112 (step 410). Note that this software package may be selected by server 106 depending upon where client 112 is located within the hierarchical directory structure on database 108.

Upon receipt of software package 302 from server 106, client 112 executes self-extracting header 304 to install the agent on client 112 (step 412). Finally, client 112 executes the agent to download software and security policies and to enforce these security policies.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate cross-domain push deployment of software in an enterprise environment, comprising:

receiving a machine name and a domain name at a server, wherein the machine name and the domain name are associated with a client;

associating the machine name with the domain name, wherein associating the machine name with the domain name establishes what software to deploy to the client, by creating an entry in a hierarchical directory structure based on the machine name and the domain name, so that the deployed software is selected based on a location of the client in the hierarchical directory structure;

accepting a user name and a password at the server, wherein the user name and the password are used to gain access to the client;

authenticating the server to the client using the user name and password;

pushing a software package to the client from the server; and allowing an agent to download a software policy from the server to the client, wherein the agent enforces the software policy;

wherein pushing the software package to the client includes;

copying the software package to the client from the server;

installing the agent from the software package onto the client; and executing the agent on the client;

wherein the software package includes a self-extracting header and a compressed installation package;

wherein the self-extracting header is an executable program that opens the compressed installation program upon execution and installs a payload of the compressed installation package;

wherein the payload is capable of downloading software and security policies from the server and enforcing the security policies.

2. The method of claim 1, wherein the domain name is associated with a domain, wherein the domain includes an untrusted domain.

3. The method of claim 2, further comprising accessing the domain across a network.

4. The method of claim 3, wherein the network includes the Internet.

5. The method of claim 1, wherein authenticating the server to the client includes establishing administrator privileges on the client.

6. The method of claim 1, wherein the hierarchical directory structure is organized to map a physical layout of an enterprise system.

7. The method of claim 1, wherein the hierarchical directory structure is organized to map a logical layout of an enterprise system.

8. A computer-readable storage medium storing computer-readable instructions that when executed by a computer cause the computer to perform a method to facilitate cross-domain push deployment of software in an enterprise environment, comprising:

receiving a machine name and a domain name at a server, wherein the machine name and the domain name are associated with a client;

associating the machine name with the domain name, wherein associating the machine name with the domain name establishes what software to deploy to the client by creating an entry in a hierarchical directory structure based on the machine name and the domain name, so that the deployed software is selected based on a location of the client in the hierarchical directory structure;

accepting a user name and a password at the server, wherein the user name and the password are used to gain access to die client;

authenticating the server to the client using the user name and password;

pushing a software package to the client from the server; and allowing an agent to download a software policy from the server to the client, wherein the agent enforces the software policy;

wherein pushing the software package to the client includes;

copying the software package to the client from the server;

installing the agent from the software package onto the client; and executing the agent on the client;

wherein the software package includes a self-extracting header and a compressed installation package;

wherein the self-extracting header is executable program that opens the compressed installation program upon execution and installs a payload of the compressed installation package;

wherein the payload is capable of downloading software and security policies from the server and enforcing the security policies.

9. The computer-readable storage medium of claim 8, wherein the domain name is associated with a domain, wherein the domain includes an untrusted domain.

10. The computer-readable storage medium of claim 9, the method further comprising accessing the domain across a network.

11. The computer-readable storage medium of claim 10, wherein the network includes the Internet.

12. The computer-readable storage medium of claim 8, wherein authenticating the server to the client includes establishing administrator privileges on the client.

13. An apparatus to facilitate cross-domain push deployment of software in an enterprise environment, comprising:

a receiving mechanism that is configured to receive a machine name and a domain name at a server, wherein the machine name and the domain name are associated with a client;

an associating mechanism that is configured to associate the machine name with the domain name, wherein associating the machine name with the domain name establishes what software to deploy to the client, by creating an entry in a hierarchical directory structure based on the machine name and the domain name, so that the deployed software is selected based on a location of the client in the hierarchical directory structure;

an accepting mechanism that is configured to accept a user name and a password at the server, wherein the user name and the password are used to gain access to the client;

an authenticating mechanism that is configured to authenticate the server to the client using the user name and password;

a software pushing mechanism that is configured to push a software package to the client from the server;

an allowing mechanism that is configured to allow an agent to download a software policy from the server to the client;

an enforcing mechanism that is configured to enforce the software policy;

a copying mechanism that is configured to copy the software package to the client from the server;

an installing mechanism that is configured to install the agent from the software package onto the client; and an executing mechanism that is configured to execute the agent on the client;

wherein the software package includes a self-extracting header and a compressed installation package;

wherein the self-extracting header is an executable program that opens the compressed installation program upon execution and installs a payload of the compressed installation package;

wherein the payload is capable of downloading software and security policies from the server and enforcing the security policies.

14. The apparatus of claim 13, wherein the domain name is associated with a domain, wherein the domain includes an untrusted domain.

15. The apparatus of claim 14, further comprising an accessing mechanism that is configured to access the domain across a network.

16. The apparatus of claim 15, wherein the network includes the Internet.

17. The apparatus of claim 13, further comprising an establishing mechanism that is configured to establish administrator privileges on the client.

* * * * *

UNITED STATES PATENT AND TRADEMARK OFFICE
CERTIFICATE OF CORRECTION

PATENT NO. : 7,069,581 B2
APPLICATION NO. : 09/971333
DATED : June 27, 2006
INVENTOR(S) : Fu et al.

It is certified that error appears in the above-identified patent and that said Letters Patent is hereby corrected as shown below:

Col. 1, line 14, replace "TO BE ASSIGNED" with -- 09/952,755 --;
Col. 5, line 15, replace "includes;" with -- includes: --;
Col. 5, line 56, replace "client" with -- client, --;
Col. 5, line 64, replace "die" with -- the --;
Col. 6, line 7, replace "includes;" with -- includes: --;
Col. 6, line 15, replace "is" with -- is an --.

Signed and Sealed this

Twenty-sixth Day of October, 2010

David J. Kappos
*Director of the United States Patent and Trademark Office*